United States Patent
Yan

(10) Patent No.: US 12,095,733 B2
(45) Date of Patent: Sep. 17, 2024

(54) FIREWALL CONFIGURATION METHOD AND APPARATUS AND PACKET SENDING METHOD AND APPARATUS

(71) Applicant: Huawei Cloud Computing Technologies Co., Ltd., Guizhou (CN)

(72) Inventor: Botao Yan, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 925 days.

(21) Appl. No.: 16/943,264

(22) Filed: Jul. 30, 2020

(65) Prior Publication Data

US 2020/0358745 A1 Nov. 12, 2020

Related U.S. Application Data

(63) Continuation of application No. PCT/CN2018/104307, filed on Sep. 6, 2018.

(30) Foreign Application Priority Data

Jan. 31, 2018 (CN) .......................... 201810099188.8

(51) Int. Cl.
  *H04L 9/40* (2022.01)
  *G06F 9/455* (2018.01)

(52) U.S. Cl.
  CPC ...... *H04L 63/0263* (2013.01); *G06F 9/45558* (2013.01); *H04L 63/101* (2013.01); *G06F 2009/45595* (2013.01)

(58) Field of Classification Search
  CPC ... H04L 63/0263; H04L 63/101; H04L 63/02; H04L 63/0227; H04L 12/462; H04L 63/0218; H04L 63/0272; G06F 9/45558; G06F 2009/45595
  See application file for complete search history.

(56) References Cited

U.S. PATENT DOCUMENTS

| | | | |
|---|---|---|---|
| 8,893,274 B2 * | 11/2014 | Zhu | G06F 21/53 718/1 |
| 2009/0222542 A1 | 9/2009 | Miyajima | |
| 2013/0227674 A1 * | 8/2013 | Anderson | H04L 63/1441 726/15 |

(Continued)

FOREIGN PATENT DOCUMENTS

| | | |
|---|---|---|
| CN | 101013382 A | 8/2007 |
| CN | 104023011 A | 9/2014 |

(Continued)

OTHER PUBLICATIONS

Anonymous:"Amazon Virtual private cloud-user Guide", May 18, 2014, 156 pages.

*Primary Examiner* — Bruce S Ashley
(74) *Attorney, Agent, or Firm* — Conley Rose, P.C.

(57) ABSTRACT

A firewall configuration method, applied to a cloud computing management platform, includes determining, by a compute node, a subnet associated with firewall policy information, determining that a virtual machine that belongs to the subnet is deployed on the compute node, and delivering the firewall policy information to a network access control list corresponding to the subnet. The network access control list and a local list of a virtual machine bridge of the virtual machine are in a jump relationship.

18 Claims, 9 Drawing Sheets

(56) References Cited

U.S. PATENT DOCUMENTS

| | | | |
|---|---|---|---|
| 2014/0280738 A1* | 9/2014 | Kolker | H04L 12/46 709/218 |
| 2015/0103839 A1* | 4/2015 | Chandrashekhar | H04L 45/44 370/401 |
| 2015/0222480 A1 | 8/2015 | Gan et al. | |
| 2017/0257260 A1 | 9/2017 | Govindan et al. | |
| 2017/0366504 A1 | 12/2017 | Zhou et al. | |
| 2018/0026944 A1* | 1/2018 | Phillips | H04L 63/1433 726/4 |

FOREIGN PATENT DOCUMENTS

| | | |
|---|---|---|
| CN | 104247332 A | 12/2014 |
| CN | 105471662 A | 4/2016 |
| CN | 106453333 A | 2/2017 |
| CN | 107517119 A | 12/2017 |
| CN | 108471397 A | 8/2018 |

\* cited by examiner

12,095,733 B2

FIREWALL CONFIGURATION METHOD AND APPARATUS AND PACKET SENDING METHOD AND APPARATUS

CROSS-REFERENCE TO RELATED APPLICATIONS

This application is a continuation of International Patent Application No. PCT/CN2018/104307 filed on Sep. 6, 2018, which claims priority to Chinese Patent Application No. 201810099188.8 filed on Jan. 31, 2018. The disclosures of the aforementioned applications are hereby incorporated by reference in their entireties.

TECHNICAL FIELD

This application relates to network technologies, and in particular, to a firewall configuration method and apparatus and a packet sending method and apparatus.

BACKGROUND

A cloud computing management platform (OPEN-STACK) is an open source project intended to provide software for construction and management of a virtual public cloud and a virtual private cloud (VPC), and relates to various aspects such as a network, virtualization, an operating system, and a server. The virtual public cloud and the VPC are constructed based on the cloud computing management platform, to fully use a large quantity of physical resources.

Network architectures of the virtual public cloud and the VPC usually include several subnets having different access control policies. A centralized routing manner is usually used for routing between different subnets. In the virtual network architecture in which centralized routing is used, an access control policy is usually implemented using a firewall disposed on a router. An existing firewall is disposed in namespace of the router, and is implemented using an iptables technology built in a LINUX operating system.

As access traffic increases, a technology of a distributed virtual router (DVR) starts to be increasingly used in the virtual network architecture, to overcome a problem that a network node has an insufficient processing capability in a centralized routing architecture. FIG. 1 is a schematic diagram of an embodiment of a virtual network architecture. Correspondingly, in a virtual network architecture in which distributed routing is used, a firewall is deployed in namespace of an integrated bridge. As shown in FIG. 1, in a distributed routing technology, packets between virtual machines that are of different subnets and that are across compute nodes have different round-trip communication paths. However, according to a principle of an iptables technology, when the firewall does not receive a response packet of a request packet, the firewall discards the request packet, cannot establish connection tracking of a flow to which the request packet belongs, and cannot implement access control. Therefore, a firewall in an existing centralized routing technology is not applicable to the network architecture in which distributed virtual routing is used.

SUMMARY

This application provides a firewall configuration method and apparatus and a packet sending method and apparatus, to resolve a problem that a firewall in an existing centralized routing technology is not applicable to a network architecture in which distributed virtual routing is used.

According to a first aspect of this application, a firewall configuration method is provided, and is applied to a compute node of a cloud computing management platform. The method includes determining, by a compute node, a subnet associated with received firewall policy information, determining, by the compute node, that a virtual machine that belongs to the subnet is deployed on the compute node, and delivering, by the compute node, the firewall policy information to a network access control list corresponding to the subnet, where the network access control list and a local list of a virtual machine bridge of the virtual machine are in a jump relationship.

The firewall policy information is delivered to a virtual machine bridge corresponding to each virtual machine included in the subnet such that when the virtual machine sends a received packet using the virtual machine bridge, an access packet and a response packet that belong to a same flow need to pass through a firewall deployed in the virtual machine bridge, to ensure that the firewall can implement packet access control. The firewall configuration method in this implementation is applicable to a distributed routing system.

In a possible implementation of the first aspect, before delivering, by the compute node, the firewall policy information to a network access control list corresponding to the subnet, when there is no network access control list corresponding to the subnet, the compute node further creates the network access control list corresponding to the subnet.

In a possible implementation of the first aspect, before determining, by a compute node, a subnet associated with received firewall policy information, the compute node further receives the firewall policy information. The firewall configuration method further includes determining, by the compute node, that the received firewall policy information is not associated with the subnet, and deleting, from all network access control lists in the compute node, a rule that is the same as a rule included in the firewall policy information.

When the firewall policy information is not associated with the subnet, the firewall policy information is deleted such that excessive information interaction in a deletion process of the firewall policy information is avoided, and the deletion process of the firewall policy information is simplified.

In a possible implementation of the first aspect, after receiving, by the compute node, the firewall policy information, the compute node further determines that a firewall in the firewall policy information is associated with the subnet, and that an ingress or egress policy in the firewall policy information includes at least one rule.

According to a second aspect of this application, a packet sending method is provided. The method is applied to a virtual machine bridge, the virtual machine bridge is deployed on a compute node to which a corresponding virtual machine belongs, and the method includes receiving, by the virtual machine bridge, a first request packet sent by the virtual machine corresponding to the virtual machine bridge, when there is no connection tracking of the first request packet in a firewall session table, determining whether the first request packet matches a firewall rule, when the first request packet matches the firewall rule, sending the first request packet to an integrated bridge, and when receiving a first response packet that is of the first request packet and that is sent by the integrated bridge, adding first connection tracking of the first request packet to the firewall session table, and sending the first response packet to the virtual machine.

The firewall is deployed in the virtual machine bridge, to ensure that the firewall can receive both a request packet and a response packet that belong to a same flow, and that a connection tracking can be established. Therefore, it is ensured that the firewall works normally in a distributed network architecture.

In a possible implementation of the second aspect, the virtual machine bridge further determines whether the first request packet matches a preset access control list rule. If the first request packet matches the preset access control list rule, the virtual machine bridge sends the first request packet to the integrated bridge.

In a possible implementation of the second aspect, the preset access control list rule includes at least one of the following the first request packet is in a subnet to which the virtual machine belongs, the first request packet is used to access a cloud-init service or an intrusion detection system (IDS) service, the first request packet is a broadcast packet, or the first request packet is a multicast packet.

In a possible implementation of the second aspect, the virtual machine bridge further receives a second request packet sent by the integrated bridge, when there is no connection tracking of the second request packet in the firewall session table, determines whether the second request packet matches the firewall rule, when the second request packet matches the firewall rule, sends the second request packet to the virtual machine, and when receiving a second response packet that is of the second request packet and that is sent by the virtual machine, adds second connection tracking of the second request packet to the session table, and sends the second response packet to the integrated bridge.

According to a third aspect of this application, a firewall configuration apparatus is provided. The apparatus is configured to perform the method in the first aspect or any possible implementation of the first aspect. Further, the apparatus includes a module configured to perform the method according to the first aspect or any possible implementation of the first aspect.

In a possible implementation of the third aspect, the firewall configuration apparatus is deployed on a compute node, and the apparatus includes a subnet obtaining module configured to determine a subnet associated with received firewall policy information, a virtual machine determining module configured to determine that a virtual machine that belongs to the subnet is deployed on the compute node, and a firewall policy information delivery module configured to deliver the firewall policy information to a network access control list corresponding to the subnet.

The network access control list and a local list of a virtual machine bridge of the virtual machine are in a jump relationship.

In a first possible implementation of the third aspect, the apparatus further includes a network access control list creation module configured to, when there is no network access control list corresponding to the subnet, create the network access control list corresponding to the subnet.

In a first possible implementation of the third aspect, the apparatus further includes a receiving module configured to receive the firewall policy information, and a deletion module configured to, when the subnet obtaining module determines that the received firewall policy information is not associated with the subnet, delete, from all network access control lists in the compute node, a rule that is the same as a rule included in the firewall policy information.

In a first possible implementation of the third aspect, the apparatus further includes a firewall policy information check module configured to determine that a firewall in the firewall policy information is associated with the subnet, and that an ingress or egress policy in the firewall policy information includes at least one rule.

According to a fourth aspect of this application, a packet sending apparatus is provided. The apparatus is configured to perform the method according to the second aspect or any possible implementation of the second aspect. The apparatus includes a module configured to perform the method according to the second aspect or any possible implementation of the second aspect.

In a possible implementation of the fourth aspect, the packet sending apparatus is deployed in a virtual machine bridge, the virtual machine bridge is deployed on a compute node to which a corresponding virtual machine belongs, and the apparatus includes a receiving module configured to receive a first request packet sent by the virtual machine corresponding to the virtual machine bridge, a matching module configured to, when there is no connection tracking of the first request packet in a firewall session table, determine whether the first request packet matches a firewall rule, a sending module configured to, when the first request packet matches the firewall rule, send the first request packet to an integrated bridge, and a firewall session table updating module configured to, when receiving a first response packet that is of the first request packet and that is sent by the integrated bridge, add first connection tracking of the first request packet to the firewall session table, and send the first response packet to the virtual machine.

In a possible implementation of the fourth aspect, the matching module is further configured to determine whether the first request packet matches a preset access control list rule.

The sending module is further configured to when the matching module determines that the first request packet matches the preset access control list rule, send the first request packet to the integrated bridge.

In a possible implementation of the fourth aspect, the preset access control list rule includes at least one of the following: the first request packet is in a subnet to which the virtual machine belongs, the first request packet is used to access a cloud-init service or an IDS service, the first request packet is a broadcast packet, or the first request packet is a multicast packet.

In a possible implementation of the fourth aspect, the receiving module is further configured to receive a second request packet sent by the integrated bridge.

The matching module is further configured to, when there is no connection tracking of the second request packet in the firewall session table, determine whether the second request packet matches the firewall rule.

The sending module is further configured to, when the second request packet matches the firewall rule, send the second request packet to the virtual machine.

The firewall session table updating module is further configured to, when a second response packet that is of the second request packet and that is sent by the virtual machine is received, add second connection tracking of the second request packet to the session table, and send the second response packet to the integrated bridge.

According to a fifth aspect of this application, a firewall configuration device is provided, and includes a processor, a memory, a communications interface, and a bus. The processor, the memory, and the communications interface are connected using the bus and communicate with each other. The memory is configured to store a computer executable instruction. When the device is run, the processor executes the computer executable instruction in the memory, to perform, using a hardware resource in the device, the operation steps in the first aspect or any possible implementation of the first aspect.

According to a sixth aspect of this application, a packet sending device is provided, and includes a processor, a memory, a communications interface, and a bus. The processor, the memory, and the communications interface are connected using the bus and communicate with each other. The memory is configured to store a computer executable instruction. When the device is run, the processor executes the computer executable instruction in the memory to perform, using a hardware resource in the device, the operation steps in the second aspect or any possible implementation of the second aspect.

According to a seventh aspect of this application, a computer-readable storage medium is provided. The computer-readable storage medium stores an instruction. When the instruction is run on a computer, the computer is enabled to perform the instruction in the method according to the first aspect or any possible implementation of the first aspect.

According to an eighth aspect of this application, a computer-readable medium is provided. The computer-readable storage medium stores an instruction. When the instruction is run on a computer, the computer is enabled to perform the instruction in the method according to the second aspect or any possible implementation of the second aspect.

Based on the implementations provided in the foregoing aspects, the implementations may be further combined in this application to provide more implementations.

DESCRIPTION OF EMBODIMENTS

The following describes some of the technical solutions in the embodiments of this application with reference to the accompanying drawings in the embodiments of this application.

Figure 2:
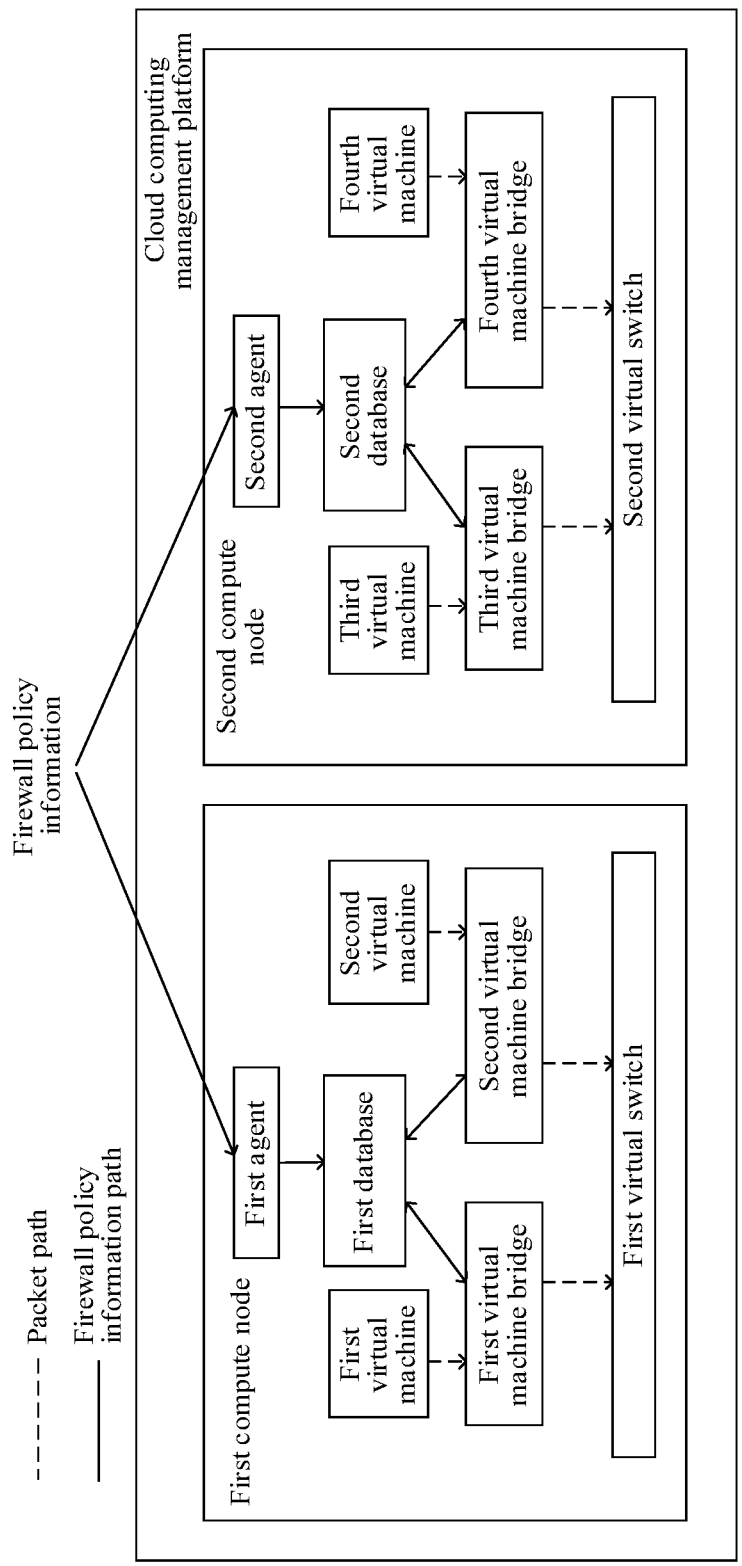
FIG. 2 is a schematic architectural diagram of a cloud computing management platform to which an embodiment of this application is applicable.

FIG. 2 is a schematic architectural diagram of a cloud computing management platform 100 to which an embodiment of this application is applicable. As shown in FIG. 2, the cloud computing management platform 100 may include at least one compute node. For example, as shown in FIG. 2, the cloud computing management platform 100 may include a first compute node 101 and a second compute node 102. Each compute node provides computing, a memory, a network, and storage resources for running an instance. In consideration of a limited management capability of a single cloud computing management platform, a plurality of cloud computing management platforms is usually combined into a cloud computing management system using a cascading structure. The cloud computing management system has a relatively high elastic scaling capability. This facilitates large-scale deployment of a virtual public cloud and a VPC. The cloud computing management system includes a first cloud computing management platform at a cascaded layer and a second cloud computing management platform at a plurality of cascaded layers. The cloud computing management platform in this embodiment of this application may be the first cloud computing management platform or the second cloud computing management platform in the cloud computing management system.

Further, each compute node may include at least an agent, a database, a virtual switch, and at least one virtual machine. For example, the first compute node 101 includes a first agent 103, a first database 104, a first virtual switch 105, a first virtual machine 106, a second virtual machine 107, a first virtual machine bridge 108, and a second virtual machine bridge 109. The second compute node 102 includes a second agent 110, a second database 111, a second virtual switch 112, a third virtual machine 113, a fourth virtual machine 114, a third virtual machine bridge 115, and a fourth virtual machine bridge 116. Quantities of virtual machines deployed on the compute nodes may be the same or may be different. An agent and a database are set in each compute node. The agent is configured to manage deployment of a virtual machine in the compute node, and the database is configured to store configuration information of the virtual machine in the compute node. Virtual machines deployed on different compute nodes may belong to a same subnet or different subnets, and virtual machines in a same subnet are connected to a same virtual switch. Further, the virtual machines are connected to the virtual switch using respective corresponding virtual machine bridges. In FIG. 2, the first virtual machine 106 and the second virtual machine 107 included in the first compute node 101 belong to a same subnet, which may be referred to as a first subnet. The third virtual machine 113 and the fourth virtual machine 114 included in the second compute node 102 belong to another subnet different from the first subnet, which may be referred to as a second subnet. Optionally, the first compute node 101 may further include a virtual machine that belongs to another subnet different from the first subnet and the second subnet. Virtual machines in a same subnet have a same access control policy, and same firewall policy information may be used. A packet between the virtual machines that belong to the same subnet may be directly forwarded inside the virtual switch.

Figure 1:
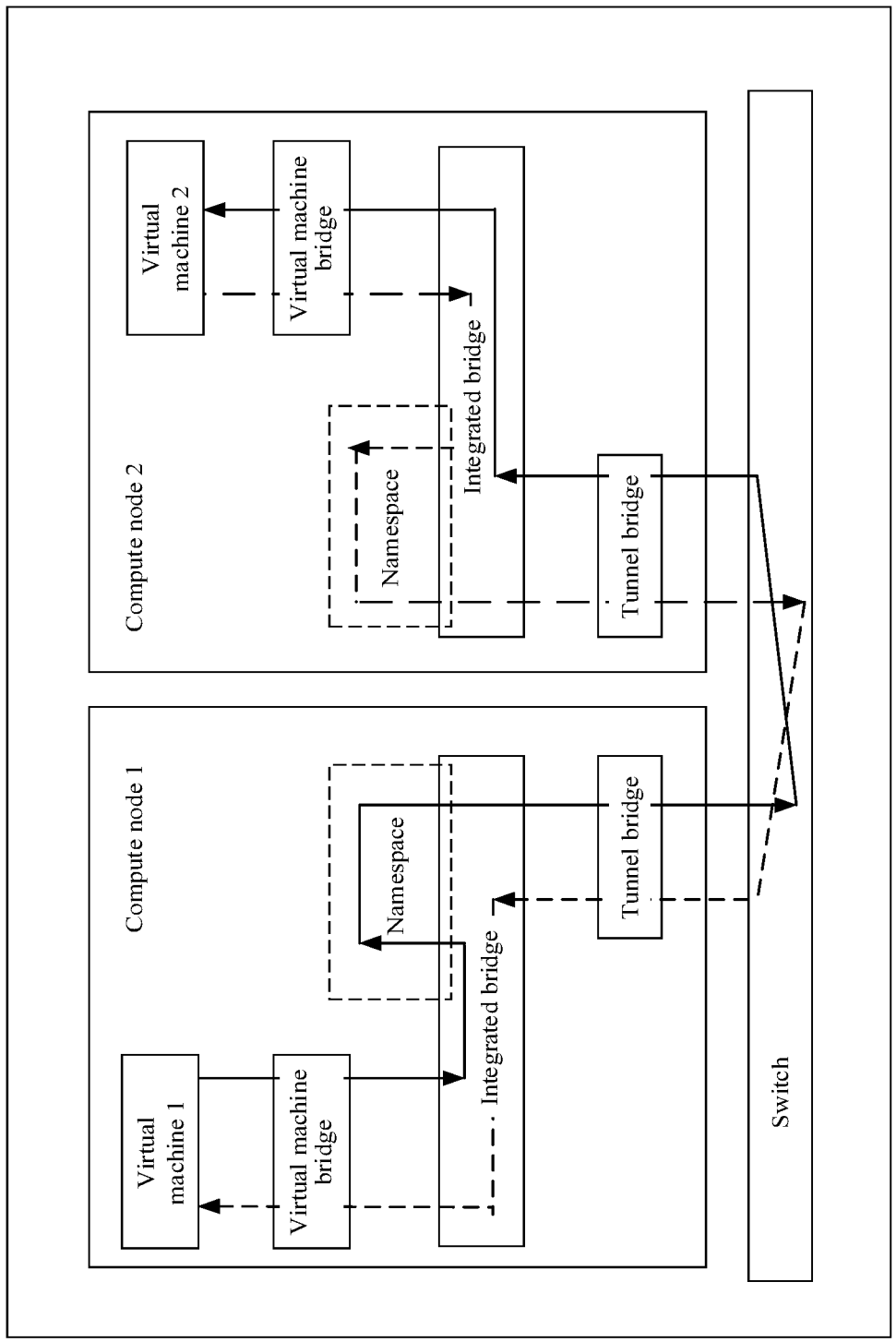
FIG. 1 is a schematic diagram of an embodiment of a virtual network architecture.

For example, when the firewall policy information is configured for the virtual machines in FIG. 2, if a conventional firewall configuration method for a network architecture in which centralized routing is used is still used, the firewall is deployed in namespace of an integrated bridge of the virtual switch, and an iptables technology built in a LINUX operating system is used as a firewall to implement packet access control. Consequently, a problem that round-trip paths of a packet may be different, and packet access control cannot be implemented. As shown in FIG. 1, an example of a communication path of a request packet between virtual machines that are of different subnets and that are across compute nodes is shown by solid lines in FIG. 1: A virtual machine 1→a virtual machine bridge→an integrated bridge→namespace→a tunnel bridge→a switch→a tunnel bridge→an integrated bridge→a virtual machine bridge→a virtual machine 2. An example of a path of a response packet corresponding to the request packet is shown by dashed lines in FIG. 1: The virtual machine 2→the virtual machine bridge→the integrated bridge→the namespace→the tunnel bridge→the switch→the tunnel bridge→the integrated bridge→the virtual machine bridge→the virtual machine 2. Therefore, the request packet and the response packet in a same flow do not pass through a firewall in a same namespace, and the request packets and the response packets have different paths. If the firewall cannot receive the response packet of the request packet, the firewall discards the request packet, and consequently, packet access control cannot be implemented. Therefore, a firewall configuration method in an existing centralized routing technology is not applicable to a network architecture in which distributed virtual routing is used.

To resolve the foregoing problems, the embodiments of this application provide a firewall configuration method and apparatus and a packet sending method and apparatus.

With reference to specific embodiments, the following describes in detail the firewall configuration method and apparatus and the packet sending method and apparatus that are provided in the embodiments of this application. In the following several specific embodiments, same or similar concepts or processes may not be described repeatedly in some embodiments.

Figure 3:
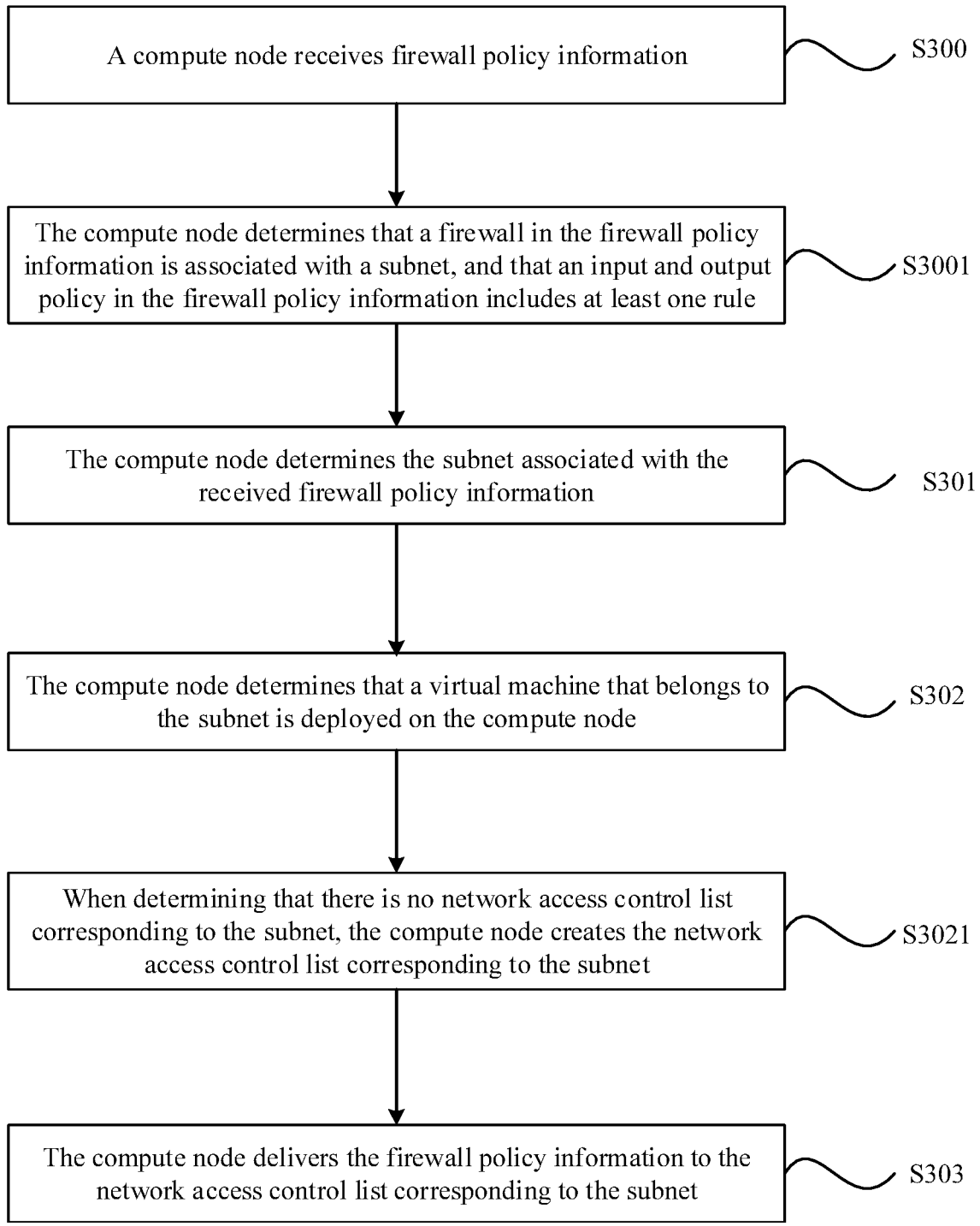
FIG. 3 is a schematic flowchart of a firewall configuration method according to Embodiment 1 of this application.

According to an aspect of the embodiments of this application, a firewall configuration method is provided. FIG. 3 is a schematic flowchart of a firewall configuration method according to Embodiment 1 of this application. In this embodiment, a compute node determines a subnet associated with received firewall policy information, and when there is a virtual machine that belongs to the subnet in the compute node, delivers the firewall policy information to a network access control list that has a jump relationship with a local list of a virtual machine bridge corresponding to the virtual machine such that the firewall policy information is deployed on a virtual machine bridge of each virtual machine. As shown in FIG. 3, the firewall configuration method provided by this embodiment is applied to the cloud computing management platform shown in FIG. 2, and the method may be performed by, for example, a proxy in a compute node. As shown in FIG. 3, the firewall configuration method includes the following steps.

S301. The compute node determines a subnet associated with the received firewall policy information.

For example, a tenant may configure a preset network on a cloud computing management platform. The preset network includes at least one subnet, and each subnet includes at least one virtual machine. Each virtual machine may be distributed on any compute node on the cloud computing management platform. Different subnets are used to implement different functions, and a specific service function may be implemented through interconnection between a plurality of subnets. For example, the preset network includes three subnets that are used as an interface layer, a service logic layer, and a data access layer, respectively. The interface layer is configured to receive an access request from a user. The service logic layer is configured to determine specific service content based on the access request, and access the data access layer. The interface layer does not directly interact with the data access layer, but establishes a connection with the data access layer using the service logical layer in the middle, and interacts with the data access layer using the service logical layer. There are different access control policies in the three subnets, to ensure data security.

For example, the cloud computing management platform receives firewall policy information entered by a tenant, and delivers the firewall policy information to each compute node included in the cloud computing management platform. The firewall policy information includes a subnet associated with a firewall, a firewall policy, and a rule included in the firewall policy. Because a subnet to which the virtual machine deployed on the compute node belongs may be different from the subnet associated with the firewall policy information, when receiving the firewall policy information, the compute node needs to determine the subnet associated with the firewall policy information.

Optionally, a manner in which the cloud computing management platform receives the firewall policy information may be as follows. The cloud computing management platform receives the firewall policy information entered by the tenant in a command line interface or a web user interface. For example, after receiving the firewall policy information entered by the tenant, the cloud computing management platform checks validity of a parameter in the firewall policy information, and deletes invalid policy information from the firewall policy information.

Optionally, before the compute node determines the subnet associated with the received firewall policy information, the firewall configuration method further includes the following step.

S300. The compute node receives the firewall policy information.

Optionally, after the compute node receives the firewall policy information, the firewall configuration method further includes the following step.

S3001. The compute node determines that a firewall in the firewall policy information is associated with the subnet, and that an ingress or egress policy in the firewall policy information includes at least one rule.

For example, after receiving the firewall policy information, the compute node needs to determine specific content included in the firewall policy information. For example, the compute node needs to determine whether the firewall in the firewall policy information is associated with the subnet. When the firewall in the firewall policy information is not associated with the subnet, the compute node cannot determine the subnet associated with the firewall policy information, and therefore cannot determine a specific subnet to which the firewall policy information is delivered. When the firewall in the firewall policy information is associated with the subnet, the compute node further determines whether the ingress or egress policy of the firewall includes at least one rule. When the ingress or egress policy of the firewall does not include a rule, the firewall is not activated. In this case, the compute node stops delivering the firewall policy information.

S302. The compute node determines that a virtual machine that belongs to the subnet is deployed on the compute node.

For example, after determining the subnet associated with the firewall policy information, the compute node needs to determine whether the virtual machine that belongs to the subnet is deployed on the compute node. Further, an agent in the compute node scans virtual machine ports in the compute node. Because virtual machines that belong to different subnets have different virtual machine ports, the compute node may determine, based on the virtual machine port in the compute node, whether the virtual machine that belongs to the subnet associated with the firewall policy information is deployed on the node. When no virtual machine that belongs to the subnet associated with the firewall policy information is deployed on the node, the compute node stops delivering the firewall policy information. When the virtual machine that belongs to the subnet associated with the firewall policy information is deployed on the node, the compute node continues to deliver the firewall policy information.

S303. The compute node delivers the firewall policy information to a network access control list corresponding to the subnet.

The network access control list and a local list of a virtual machine bridge of the virtual machine are in a jump relationship.

For example, when the compute node determines that the firewall policy information needs to continue to be delivered, a specific delivery manner of the compute node is that the firewall policy information is delivered to a network access control list corresponding to the subnet. For example, the compute node is provided with a database, the database may be used to store network an access control list corresponding to each subnet, and the network access control list includes the firewall policy information. A virtual machine bridge corresponding to each virtual machine deployed on the compute node corresponds to a respective local list, and the local list includes a jump rule. The jump rule instructs, based on the subnet to which the virtual machine belongs, the virtual machine bridge to jump, when a received packet is sent, from the local list to a network access control list that corresponds to the subnet to which the virtual machine belongs and that is stored in the database. For example, local lists corresponding to virtual machine bridges that belong to a same subnet jump to a same network access control list. When firewall policy information of the subnet needs to be changed, only the firewall policy information of the network access control list stored in the database needs to be modified.

Optionally, before the compute node delivers the firewall policy information, the firewall configuration method further includes the following steps.

S3021. When determining that there is no network access control list corresponding to the subnet, the compute node creates the network access control list corresponding to the subnet.

For example, before delivering the firewall policy information, the compute node needs to determine that there is a network access control list corresponding to a subnet corresponding to the firewall policy information in the compute node. Further, a name of each network access control list carries an identifier of a corresponding subnet. Therefore, the compute node may determine, by scanning the name of each network access control list in the database, whether there is a network access control list corresponding to the subnet corresponding to the firewall policy information. When there is no network access control list corresponding to the subnet corresponding to the firewall policy information, the compute node creates the network access control list corresponding to the subnet corresponding to the firewall policy information.

Optionally, when the compute node delivers the firewall policy information to the network access control list, a LINUX iptables rule, an Open vSwitch flow table, and another firewall drive may be used to deliver the firewall policy information.

The firewall configuration method provided in this embodiment of this application is applied to a cloud computing management platform. The method includes determining, by the compute node, the subnet associated with the received firewall policy information, determining, by the compute node, that the virtual machine that belongs to the subnet is deployed on the compute node, and delivering, by the compute node, the firewall policy information to the network access control list corresponding to the subnet. The network access control list and the local list of the virtual machine bridge of the virtual machine are in the jump relationship. In the firewall configuration method provided in this embodiment of this application, the firewall policy information is delivered to the virtual machine bridge corresponding to each virtual machine included in the subnet such that when the virtual machine sends the received packet using the virtual machine bridge, both an access packet and a response packet that belong to a same flow need to pass through a firewall deployed on the virtual machine bridge, to ensure that the firewalls can implement packet access control. The firewall configuration method in this embodiment is applicable to a distributed routing system.

Figure 4:
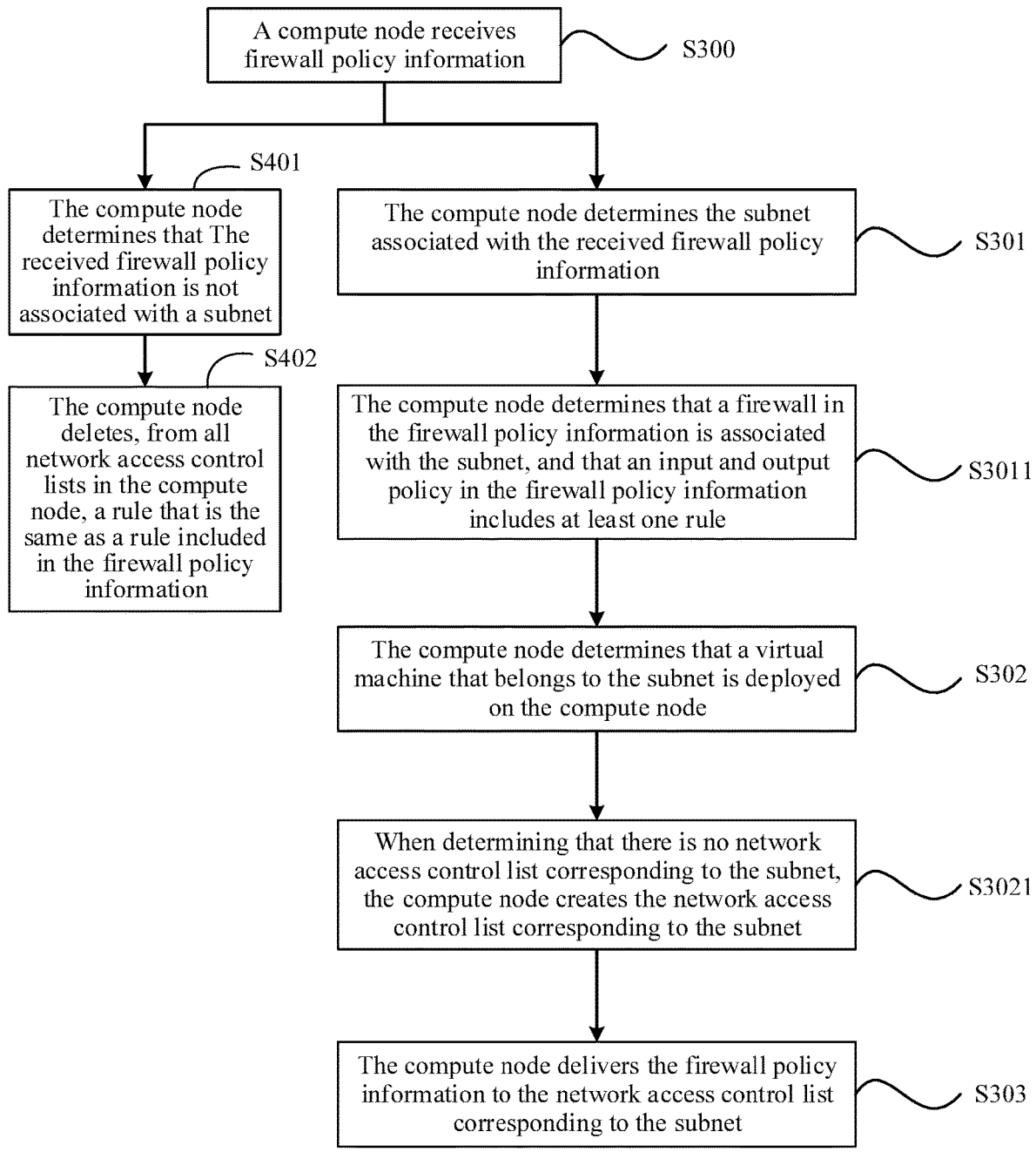
FIG. 4 is a schematic flowchart of a firewall configuration method according to Embodiment 2 of this application.

Further, based on the embodiment shown in FIG. 3, an embodiment of this application further provides a firewall configuration method. In this embodiment, deletion of firewall policy information in a firewall configuration is used as an example for description. FIG. 4 is a schematic flowchart of a firewall configuration method according to Embodiment 2 of this application. As shown in FIG. 4, the firewall configuration method includes the following steps.

S401. A compute node determines that received firewall policy information is not associated with a subnet.

For example, when receiving the firewall policy information, the compute node determines whether the firewall policy information is associated with the subnet. When the firewall policy information is associated with the subnet, a current firewall configuration process is to newly add or update the firewall policy information, and S301 to S303 in the embodiment shown in FIG. 3 may be performed. When the firewall policy information is not associated with the subnet, the current firewall configuration process is to delete the firewall policy information.

S402. The compute node deletes, from all network access control lists in the compute node, a rule that is the same as a rule included in the firewall policy information.

For example, when the compute node determines that the firewall policy information is not associated with the subnet, the compute node checks all network access control lists stored in a database. When the rule included in the network access control list is the same as the rule included in the firewall policy information, the compute node deletes the same rule.

The firewall configuration method provided in this embodiment includes determining, by the compute node, that the received firewall policy information is not associated with the subnet, and deleting, by the compute node from all the network access control lists in the compute node, the rule that is the same as the rule included in the firewall policy information. When the firewall policy information is not associated with the subnet, the firewall policy information is deleted such that excessive information interaction in a deletion process of the firewall policy information is avoided, and the deletion process of the firewall policy information is simplified.

Figure 5:
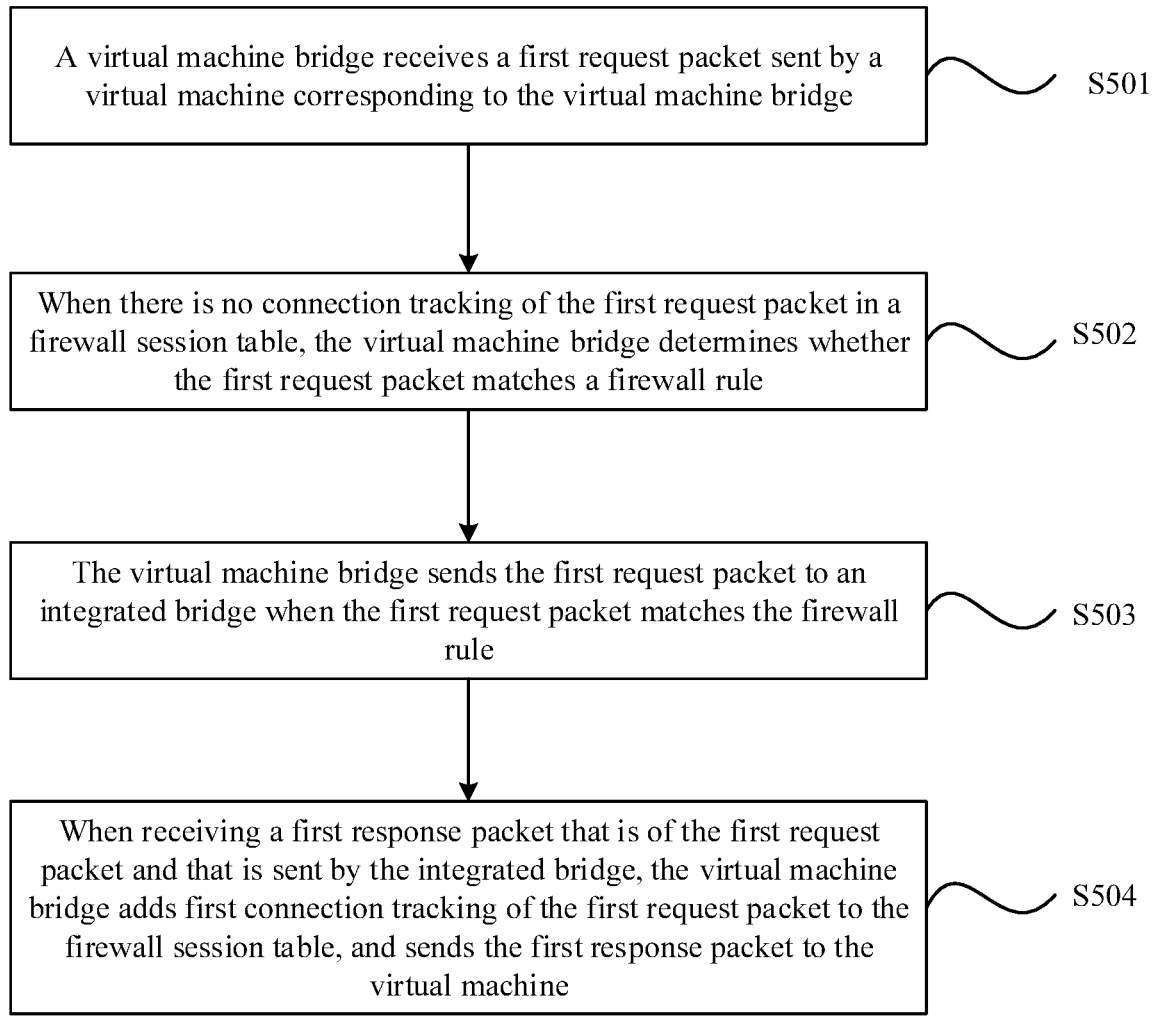
FIG. 5 is a schematic flowchart of a packet sending method according to Embodiment 1 of this application.

For example, according to another aspect of the embodiments of this application, a packet sending method is further provided, and is applied to the cloud computing management platform in any one of the foregoing embodiments. This embodiment may be executed by a virtual machine bridge in the cloud computing management platform shown in FIG. 2. FIG. 5 is a schematic flowchart of a packet sending method according to Embodiment 1 of this application. As shown in FIG. 5, the packet sending method includes the following steps.

S501. A virtual machine bridge receives a first request packet sent by a virtual machine corresponding to the virtual machine bridge.

For example, when the virtual machine sends the first request packet to another virtual machine or an external network, the virtual machine sends the first request packet to a corresponding virtual machine bridge. A firewall is deployed in the virtual machine bridge.

S502. When there is no connection tracking of the first request packet in a firewall session table, the virtual machine bridge determines whether the first request packet matches a firewall rule.

For example, after receiving the first request packet, the virtual machine bridge determines whether there is connection tracking of the first request packet in the firewall session table. For example, the virtual machine bridge determines, based on a 5-tuple of the first request packet, whether there is connection tracking of the first request packet in the firewall session table. When there is connection tracking of the first request packet in the firewall session table, the virtual machine bridge forwards the first request packet. When there is no connection tracking of the first request packet in the firewall session table, the virtual machine bridge determines whether the first request packet matches the firewall rule. For example, the firewall rule is a network access control list configured for a user.

S503. The virtual machine bridge sends the first request packet to an integrated bridge when the first request packet matches the firewall rule.

For example, the virtual machine bridge sends the first request packet to the integrated bridge when the first request packet matches the firewall rule. When the first request packet does not match the firewall rule, the first request packet may be directly discarded.

S504. When receiving a first response packet that is of the first request packet and that is sent by the integrated bridge, the virtual machine bridge adds first connection tracking of the first request packet to the firewall session table, and sends the first response packet to the virtual machine.

For example, when receiving the first response packet of the first request packet, the virtual machine bridge may add the first connection tracking of the first request packet to the firewall session table, and sends the first response packet to the virtual machine. Therefore, a request packet and a response packet that belong to a same flow as the first request packet may pass through the firewall. If the virtual machine bridge does not receive the first response packet of the first request packet within a preset time, the first request packet is discarded, and connection tracking cannot be established. Therefore, connection tracking cannot be established for a packet that does not match the firewall rule.

According to the packet sending method provided in this embodiment of this application, the firewall is deployed in the virtual machine bridge, to ensure that the firewall can receive a request packet and a response packet that belong to a same flow, and that tracking connection can be established. Therefore, it is ensured that the firewall works normally in a distributed network architecture.

Figure 6:
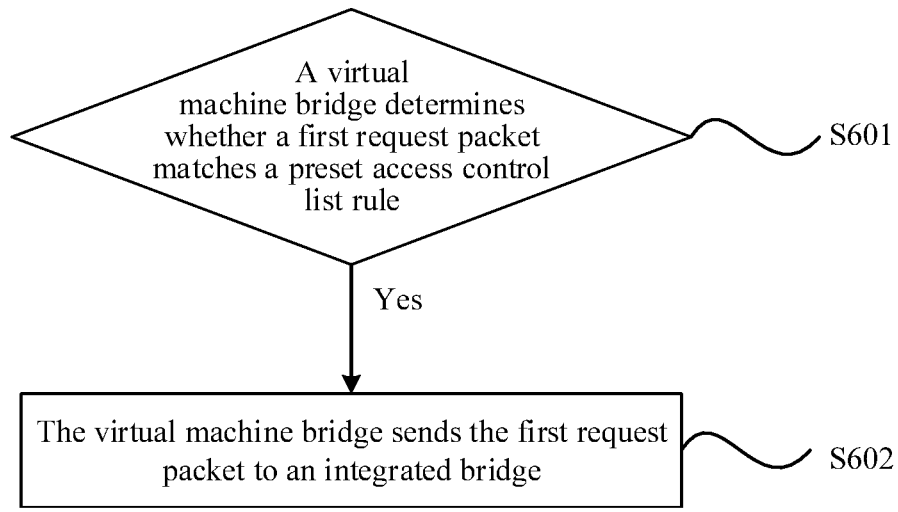
FIG. 6 is a schematic flowchart of a packet sending method according to Embodiment 2 of this application.

Optionally, an embodiment of this application further provides a packet sending method. In this embodiment, in addition to determining whether a first request packet matches a firewall rule, a virtual machine bridge further determines whether the first request packet matches a preset access control list rule. FIG. 6 is a schematic flowchart of a packet sending method according to Embodiment 2 of this application. As shown in FIG. 6, the packet sending method further includes the following steps.

S601. A virtual machine bridge determines whether a first request packet matches a preset access control list rule. If the first request packet matches the preset access control list rule, S602 is performed.

S602. The virtual machine bridge sends the first request packet to an integrated bridge.

For example, when receiving a first request packet sent by a virtual machine, the virtual machine bridge may first perform S601 to determine whether the first request packet matches the preset access control list rule. When the first request packet matches the preset access control list rule, S602 is performed to send the first request packet to the integrated bridge. When the first request packet does not match the preset access control list rule, S502 in the foregoing embodiment is performed.

For example, when receiving the first request packet sent by the virtual machine, the virtual machine bridge may first perform S502 to determine whether the first request packet matches a firewall rule. When the first request packet matches the firewall rule, S503 and S504 are performed. When the first request packet does not match the firewall rule, S601 may be performed. In this case, when the first request packet does not match the preset access control list rule, the first request packet may be discarded.

Optionally, the preset access control list rule includes at least one of the following The first request packet is in a subnet to which the virtual machine belongs, or the first request packet is used to access a cloud-init service or an IDS service, the first request packet is a broadcast packet, or the first request packet is a multicast packet.

For example, when the first request packet is in the subnet, is the broadcast packet, is the multicast packet, or is used to access the cloud-init service or the IDS service, the virtual machine bridge sends the first request packet to the integrated bridge.

In the packet sending method provided in this embodiment, the virtual machine bridge further determines whether the first request packet matches the preset access control list rule. When the first request packet matches the preset access control list rule, the virtual machine bridge directly sends the first request packet to the integrated bridge. This improves a packet sending rate.

For example, referring to the embodiment shown in FIG. 5, when the virtual machine receives a request packet, a working principle of a firewall deployed in the virtual machine bridge is similar to a working principle of the virtual machine externally sending the request packet. This application is described in detail with reference to the following embodiments.

Figure 7:
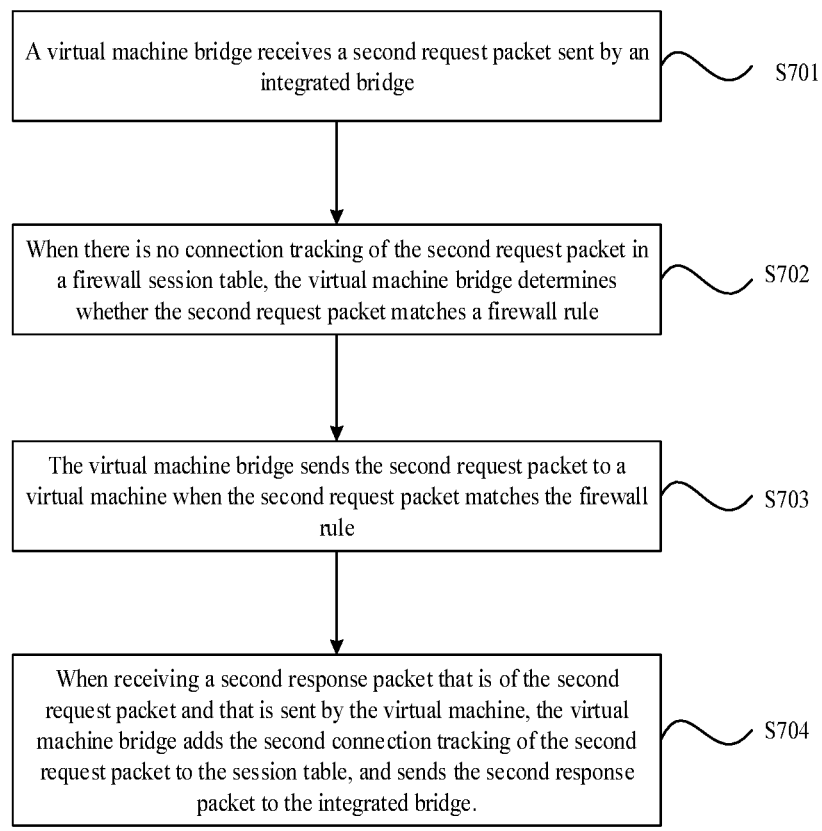
FIG. 7 is a schematic flowchart of a packet sending method according to Embodiment 3 of this application.

According to still another aspect of the embodiments of this application, a packet sending method is further provided. FIG. 7 is a schematic flowchart of a packet sending method according to Embodiment 3 of this application. As shown in FIG. 7, the method includes the following steps.

S701. The virtual machine bridge receives a second request packet sent by an integrated bridge.

S702. When there is no connection tracking of the second request packet in a firewall session table, the virtual machine bridge determines whether the second request packet matches a firewall rule.

For example, after receiving the second request packet, the virtual machine bridge determines whether there is connection tracking of the second request packet in the firewall session table. For example, the virtual machine bridge determines, based on a 5-tuple of the second request packet, whether there is connection tracking of the second request packet in the firewall session table. When there is connection tracking of the second request packet in the firewall session table, the virtual machine bridge sends the second request packet to the virtual machine. When there is no connection tracking of the second request packet in the firewall session table, the virtual machine bridge determines whether the second request packet matches the firewall rule.

S703. The virtual machine bridge sends the second request packet to the virtual machine when the second request packet matches the firewall rule.

For example, when the second request packet matches the firewall rule, the second request packet is sent to the virtual machine. When the second request packet does not match the firewall rule, the second request packet may be directly discarded.

S704. When receiving a second response packet that is of the second request packet and that is sent by the virtual machine, the virtual machine bridge adds the second connection tracking of the second request packet to the session table, and sends the second response packet to the integrated bridge.

For example, when receiving the second response packet of the second request packet, the virtual machine bridge may add the second connection tracking of the second request packet to the firewall session table, and forward the second response packet. Therefore, a request packet and a response packet that belong to a same flow as the second request packet may pass through a firewall. If the virtual machine bridge does not receive the second response packet of the second request packet within a preset time, the second request packet is discarded, and connection tracking cannot be established, to prevent the request packet that does not match the firewall rule from being sent to the virtual machine.

According to the packet sending method provided in this embodiment of this application, the firewall is deployed on the virtual machine bridge, to ensure that a firewall can receive a request packet and a response packet that belong to a same flow, and that tracking connection can be established. Therefore, it is ensured that the firewall works normally in a distributed network architecture.

Figure 8:
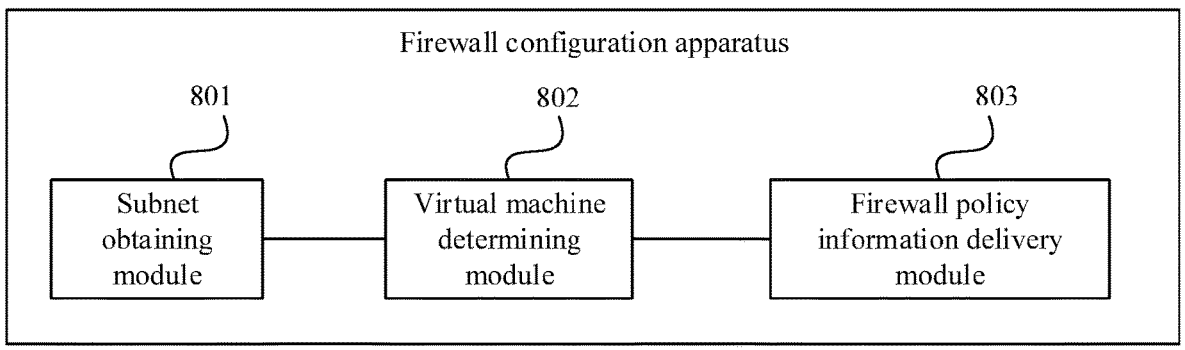
FIG. 8 is a schematic structural diagram of a firewall configuration apparatus according to Embodiment 1 of this application.

According to yet another aspect of the embodiments of this application, a firewall configuration apparatus is further provided. FIG. 8 is a schematic structural diagram of a firewall configuration apparatus according to Embodiment 1 of this application. The apparatus is deployed on a compute node, may be the agent in the embodiment shown in FIG. 2, and is configured to implement the firewall configuration method in the embodiment shown in FIG. 3 or FIG. 4. As shown in FIG. 8, the firewall configuration apparatus includes a subnet obtaining module 801 configured to determine a subnet associated with received firewall policy information, a virtual machine determining module 802 configured to determine that a virtual machine that belongs to a subnet is deployed on the compute node, and a firewall policy information delivery module 803 configured to deliver the firewall policy information to a network access control list corresponding to the subnet.

The network access control list and a local list of a virtual machine bridge of the virtual machine are in a jump relationship.

Figure 9:
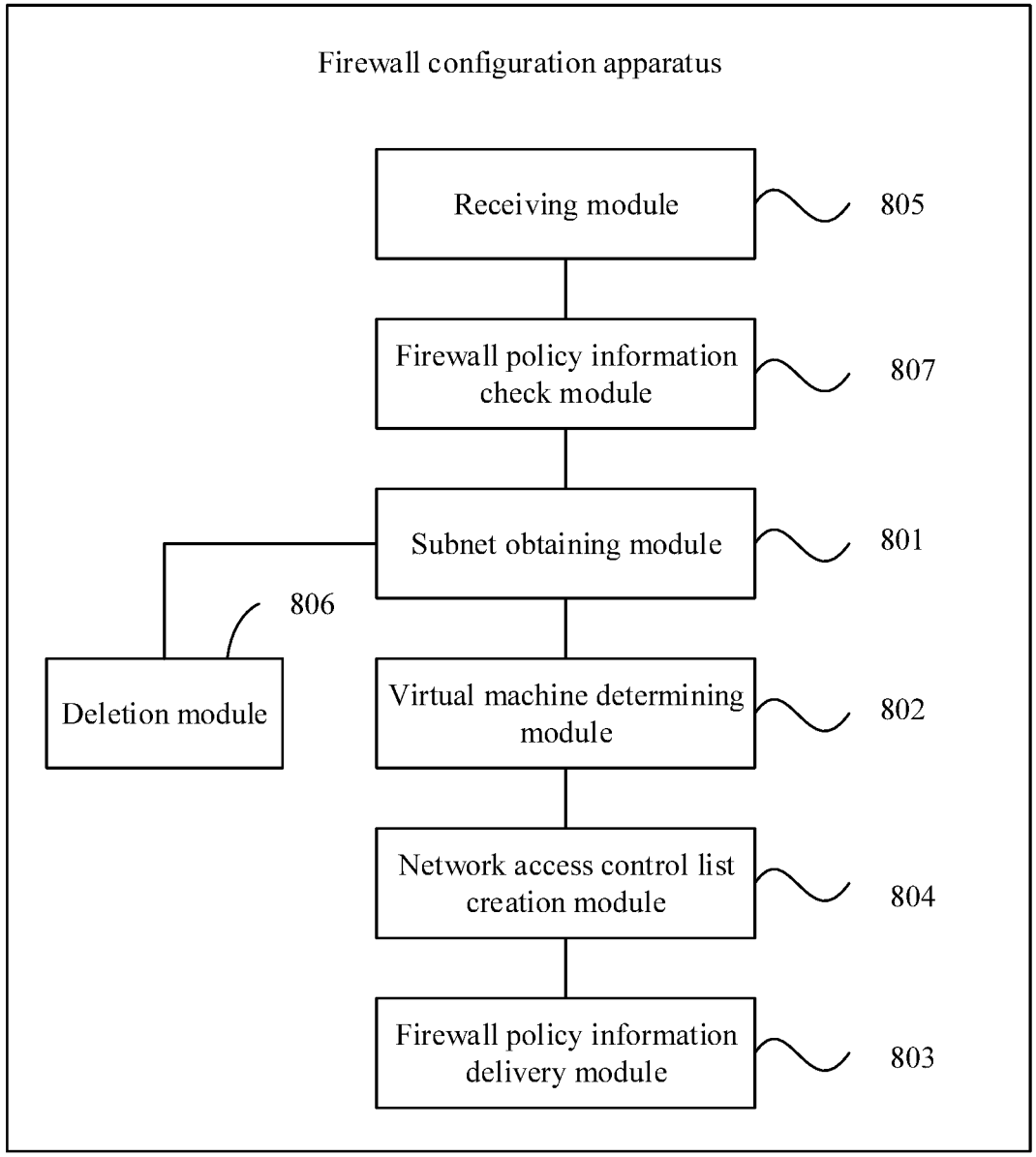
FIG. 9 is a schematic structural diagram of a firewall configuration apparatus according to Embodiment 2 of this application.

For example, based on the embodiment shown in FIG. 8, FIG. 9 is a schematic structural diagram of a firewall configuration apparatus according to Embodiment 2 of this application. As shown in FIG. 9, the firewall configuration apparatus further includes a network access control list creation module 804 configured to, when there is no network access control list corresponding to the subnet, create the network access control list corresponding to the subnet.

Optionally, as shown in FIG. 9, the firewall configuration apparatus further includes a receiving module 805 configured to receive the firewall policy information, and a deletion module 806 configured to, when the subnet obtaining module 801 determines that the received firewall policy information is not associated with the subnet, delete, from all network access control lists in the compute node, a rule that is the same as a rule included in the firewall policy information.

Optionally, as shown in FIG. 9, the firewall configuration apparatus further includes a firewall policy information check module 807 configured to determine that a firewall in the firewall policy information is associated with the subnet, and that an ingress or egress policy in the firewall policy information includes at least one rule.

Figure 10:
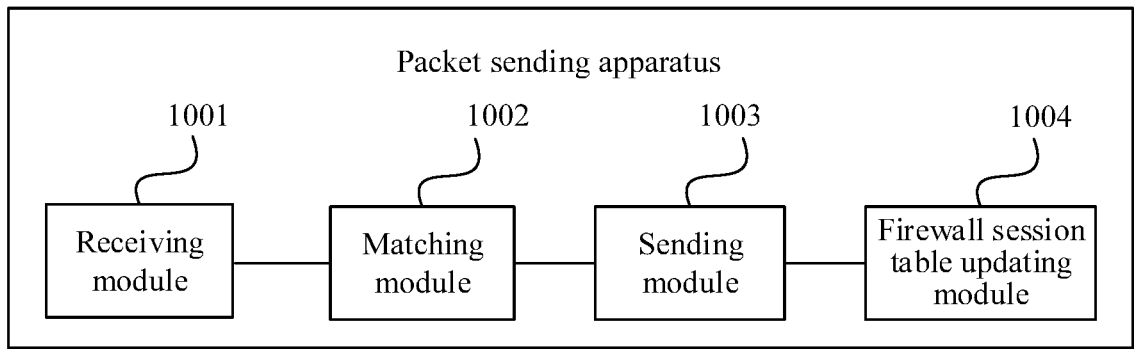
FIG. 10 is a schematic structural diagram of a packet sending apparatus according to Embodiment 1 of this application.

According to still yet another aspect of the embodiment of this application, a packet sending apparatus is further provided. FIG. 10 is a schematic structural diagram of a packet sending apparatus according to Embodiment 1 of this application. The apparatus is deployed on a virtual machine bridge, and the virtual machine bridge is deployed on a compute node to which a corresponding virtual machine belongs. The apparatus may be the virtual machine bridge in the embodiment shown in FIG. 2, and is configured to implement the packet sending method in the embodiments shown in FIG. 5 to FIG. 7. As shown in FIG. 10, the packet sending apparatus includes a receiving module 1001 configured to receive a first request packet sent by a virtual machine corresponding to the virtual machine bridge, a matching module 1002 configured to, when there is no connection tracking of the first request packet in a firewall session table, determine whether the first request packet matches a firewall rule, a sending module 1003 configured to, when the first request packet matches the firewall rule, send the first request packet to an integrated bridge, and a firewall session table updating module 1004 configured to, when receiving a first response packet that is of the first request packet and that is sent by the integrated bridge, add first connection tracking of the first request packet to the firewall session table, and send the first response packet to the virtual machine.

Optionally, the matching module 1002 is further configured to determine whether the first request packet matches a preset access control list rule.

The sending module 1003 is further configured to, when the matching module 1002 determines that the first request packet matches the preset access control list rule, send the first request packet to the integrated bridge.

Optionally, the preset access control list rule includes at least one of the following: the first request packet is in a subnet to which the virtual machine belongs, the first request packet is used to access a cloud-init service or an IDS service, the first request packet is a broadcast packet, or the first request packet is a multicast packet.

Optionally, the receiving module 1001 is further configured to receive a second request packet sent by the integrated bridge.

The matching module 1002 is further configured to, when there is no connection tracking of the second request packet in the firewall session table, determine whether the second request packet matches the firewall rule.

The sending module 1003 is further configured to, when the second request packet matches the firewall rule, send the second request packet to the virtual machine.

The firewall session table updating module 1004 is further configured to, when a second response packet that is of the second request packet and that is sent by the virtual machine is received, add second connection tracking of the second request packet to the session table, and send the second response packet to the integrated bridge.

Figure 11:
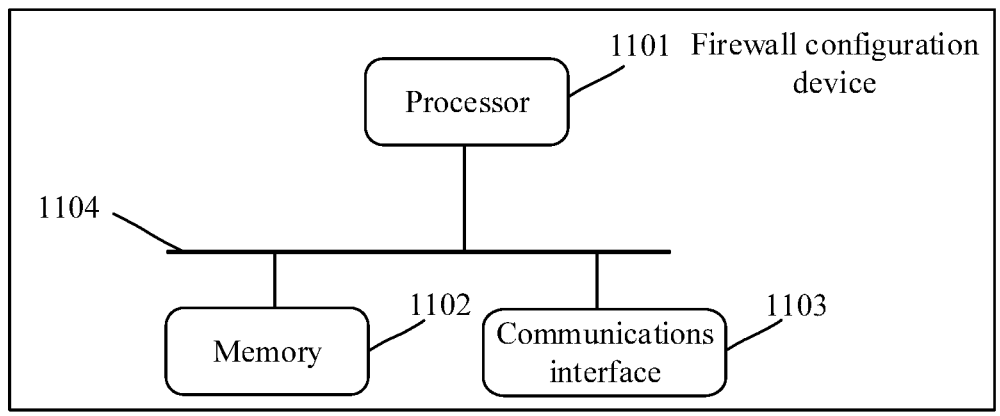
FIG. 11 is a schematic structural diagram of a firewall configuration device according to Embodiment 1 of this application.

According to a further aspect of the embodiment of this application, a firewall configuration device is further provided. FIG. 11 is a schematic structural diagram of a firewall configuration device according to Embodiment 1 of this application. As shown in FIG. 11, the firewall configuration device includes a processor 1101, a memory 1102, a communications interface 1103, and a bus 1104.

The processor 1101, the memory 1102, and the communications interface 1103 are connected using the bus 1104 and communicate with each other. The memory 1102 is configured to store a computer executable instruction. When the device is run, the processor 1101 executes the computer executable instruction in the memory 1102 to perform, using a hardware resource in the device, the steps in the firewall configuration method corresponding to FIG. 3 or FIG. 4.

Figure 12:
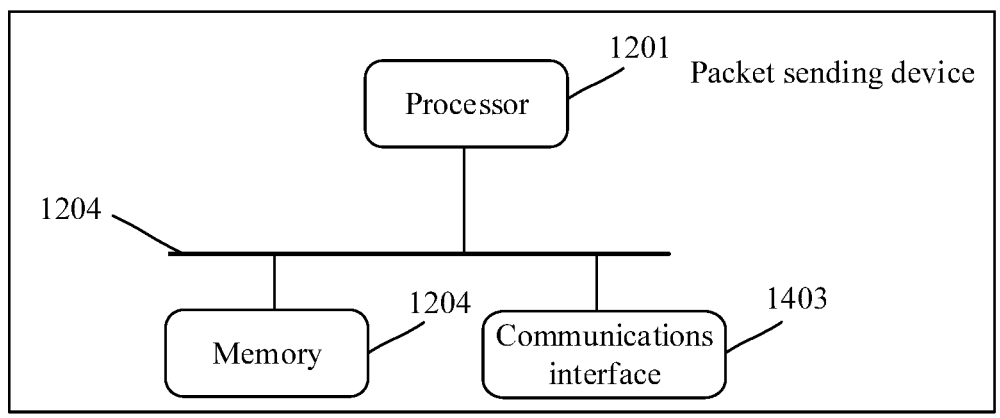
FIG. 12 is a schematic structural diagram of a packet sending device according to Embodiment 2 of this application.

According to a still further aspect of the embodiment of this application, a packet sending device is further provided. FIG. 12 is a schematic structural diagram of a packet forwarding device according to Embodiment 1 of this application. As shown in FIG. 12, the packet forwarding device includes a processor 1201, a memory 1202, a communications interface 1203, and a bus 1204.

The processor 1201, the memory 1202, and the communications interface 1203 are connected using the bus 1204 and communicate with each other. The memory 1202 is configured to store a computer executable instruction. When the device is run, the processor 1201 executes the computer executable instruction in the memory 1202 to perform, using a hardware resource in the device, the steps in the packet sending methods corresponding to FIG. 5 to FIG. 7.

According to a yet further aspect of the embodiment of this application, a computer-readable medium is further provided. The computer-readable storage medium stores an instruction. When the instruction is run on a computer, the computer is enabled to perform the instruction in the firewall configuration method corresponding to FIG. 3 or FIG. 4.

According to a still yet further aspect of the embodiment of this application, a computer-readable medium is further provided. The computer-readable storage medium stores an instruction. When the instruction is run on a computer, the computer is enabled to perform the instruction in the firewall configuration methods corresponding to FIG. 5 to FIG. 7.

A person of ordinary skill in the art may be aware that in combination with the examples described in the embodiments disclosed in this specification, methods and steps may be implemented by electronic hardware or a combination of computer software and electronic hardware. Whether the functions are performed by hardware or software depends on particular applications and design constraint conditions of technical solutions. A person skilled in the art may use different methods to implement the described functions for each particular application, but it should not be considered that the implementation goes beyond the scope of this application.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a twisted pair) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a FLOPPY DISK, a hard disk, or a magnetic tape), an optical medium (for example, an optical disc), or a non-transitory machine-readable medium such as a semiconductor medium (for example, a solid-state drive (SSD)) that can store program code.

It should be noted that the embodiments provided in this application are merely examples. A person skilled in the art may be clearly aware that for convenience and conciseness of description, in the foregoing embodiments, the embodiments emphasize different aspects, and for a part not described in detail in one embodiment, refer to related description of another embodiment. The embodiments of this application and the features disclosed in the accompanying drawings may independently exist, or may exist in a combination manner. Features described in a hardware form in the embodiments of this application may be executed by software, and vice versa. This is not limited herein.

What is claimed is:

1. A firewall configuration method implemented, wherein the firewall configuration method comprises:
receiving at a compute node, firewall policy information;
identifying a subnet associated with the firewall policy information;
detecting that a virtual machine that belongs to the subnet is deployed on the compute node wherein the virtual machine is associated with a virtual machine bridge, the virtual machine bridge comprises a local list,
wherein the local list includes a jump rule that associates subnets with respective network access control lists for directing respective traffic of the subnets according to respective firewall policies in the respective network access control lists;

obtaining, using the jump rule in the local list of the virtual machine bridge associated with the virtual machine, a network access control list that is associated with the subnet of the virtual machine, when determining that there is no network access control list corresponding to the subnet, the compute node creates the network access control list corresponding to the subnet; and delivering the firewall policy information to the network access control list corresponding to the subnet.

2. The firewall configuration method of claim 1, further comprising:

determining, based on the identified subnet, that the firewall policy information is not associated with the subnet; and deleting, from all network access control lists in the compute node, a rule comprised in the firewall policy information.

3. The firewall configuration method of claim 2, wherein after receiving the firewall policy information, the firewall configuration method further comprises:

determining, based on the identified subnet, that a firewall in the firewall policy information is associated with the subnet; and detecting that an ingress policy in the firewall policy information comprises the rule.

4. The firewall configuration method of claim 2, wherein after receiving the firewall policy information, the firewall configuration method further comprises:

identifying that a firewall in the firewall policy information is associated with the subnet; and detecting that an egress policy in the firewall policy information comprises the rule.

5. The firewall configuration method of claim 1, further comprising:

receiving, by the virtual machine bridge that is deployed on the compute node, a first request packet from the virtual machine, wherein the first request packet is in the subnet to which the virtual machine belongs;

verifying, by the virtual machine bridge, whether the first request packet matches a firewall rule based on the network access control list when there is no connection tracking of the first request packet in a firewall session table;

sending, by the virtual machine bridge the first request packet to an integrated bridge when the first request packet matches the firewall rule;

receiving, by the virtual machine bridge, a first response packet of the first request packet from the integrated bridge;

adding, by the virtual machine bridge, first connection tracking of the first request packet to the firewall session table; and sending, by the virtual machine bridge, the first response packet to the virtual machine.

6. The firewall configuration method of claim 5, further comprising:

verifying whether the first request packet matches a preset access control list rule in the network access control list; and sending the first request packet to the integrated bridge when the first request packet matches the preset access control list rule.

7. The firewall configuration method of claim 6, wherein the preset access control list rule comprises that the first request packet is in the subnet to which the virtual machine belongs.

8. The firewall configuration method of claim 6, further comprising:

receiving a second request packet from the integrated bridge;

verifying whether the second request packet matches the firewall rule when there is no connection tracking of the second request packet in the firewall session table;

sending the second request packet to the virtual machine when the second request packet matches the firewall rule;

receiving a second response packet of the second request packet from the virtual machine;

adding second connection tracking of the second request packet to the firewall session table; and sending the second response packet to the integrated bridge.

9. The firewall configuration method of claim 6, wherein the preset access control list rule comprises that the first request packet accesses a cloud-init service.

10. The firewall configuration method of claim 6, wherein the preset access control list rule comprises that the first request packet accesses an intrusion detection system (IDS) service.

11. The firewall configuration method of claim 6, wherein the preset access control list rule comprises that the first request packet is a broadcast packet.

12. The firewall configuration method of claim 6, wherein the preset access control list rule comprises that the first request packet is a multicast packet.

13. A firewall configuration device comprising:

a storage device configured to store computer executable instructions; and a processor coupled to the storage device, wherein the computer executable instructions cause the processor to be configured to:

receive firewall policy information;

identify a subnet associated with the firewall policy information;

detect that a virtual machine that belongs to the subnet is deployed on the firewall configuration device, wherein the virtual machine is associated with a virtual machine bridge, the virtual machine bridge comprises a local list, wherein the local list of the virtual machine bridge includes a jump rule that associates subnets with respective network access control lists for directing respective traffic of the subnets according to respective firewall policies in the respective network access control lists;

obtain, using the jump rule in the local list of the virtual machine bridge associated with the virtual machine, a network access control list that is associated with the subnet of the virtual machine, when determining that there is no network access control list corresponding to the subnet, the compute node creates the network access control list corresponding to the subnet; and deliver the firewall policy information to the network access control list corresponding to the subnet.

14. The firewall configuration device of claim 13, wherein the computer executable instructions further cause the processor to be configured to:

determine, based on the identified subnet, that the firewall policy information is not associated with the subnet; and delete, from all network access control lists in the firewall configuration device, a rule that is the same as a rule comprised in the firewall policy information.

15. The firewall configuration device of claim 14, wherein the computer executable instructions further cause the processor to be configured to detect that a firewall in the firewall policy information is associated with the subnet, and that an ingress or egress policy in the firewall policy information comprises the rule.

16. A computer program comprising computer instructions that are stored on a non-transitory computer-readable storage medium and that, when executed by at least one processor, cause an electronic device to:
- receive firewall policy information;
- identify a subnet associated with the firewall policy information;
- detect that a virtual machine that belongs to the subnet is deployed on the electronic device, wherein the virtual machine is associated with a virtual machine bridge, the virtual machine bridge comprises a local list, wherein the local list of the virtual machine bridge includes a jump rule that associates subnets with respective network access control lists for directing respective traffic of the subnets according to respective firewall policies in the respective network access control lists;
- obtain, using the jump rule in the local list of the virtual machine bridge associated with the virtual machine, a network access control list that is associated with the subnet of the virtual machine,
- when determining that there is no network access control list corresponding to the subnet, the compute node creates the network access control list corresponding to the subnet; and
- deliver the firewall policy information to the network access control list corresponding to the subnet.

17. The computer program of claim 16, wherein the instructions, when executed by at least one processor, further cause an electronic device to:
- determine, based on the identified subnet, that the firewall policy information is not associated with the subnet; and
- delete, from all network access control lists, a rule comprised in the firewall policy information.

18. The computer program of claim 17, wherein the instructions, when executed by at least one processor, further cause an electronic device to after receiving the firewall policy information:
- determine, based on the identified subnet, that a firewall in the firewall policy information is associated with the subnet; and
- detect that an ingress policy in the firewall policy information comprises the rule.

\* \* \* \* \*